United States Patent [19]

Daniels

[11] 4,446,507

[45] May 1, 1984

[54] AUTOMOBILE HEADLIGHT CONTROL SYSTEM

[76] Inventor: Ronald M. Daniels, 112 Westhill Rd., Elliot Lake, Canada, P5A 1A7

[21] Appl. No.: 442,009

[22] Filed: Mar. 29, 1983

[51] Int. Cl.³ .............................................. F21V 19/04
[52] U.S. Cl. ........................................ 362/20; 362/61; 362/80; 362/83; 362/233; 362/251; 362/254; 362/276; 362/802
[58] Field of Search ...................... 362/20, 61, 80, 83, 362/233, 251, 254, 276, 802

[56] References Cited

U.S. PATENT DOCUMENTS 1,648,571 11/1927 Ziska ..................................... 362/20
4,217,626 8/1980 Bindle et al. .......................... 362/20

Primary Examiner—Stephen J. Lechert, Jr.

[57] ABSTRACT

The present invention provides a lighting system for use on a vehicle with the system including two sets of low beam driving lights and switching circuits for switching from one set to the other in the event of one of the sets failing.

8 Claims, 1 Drawing Figure

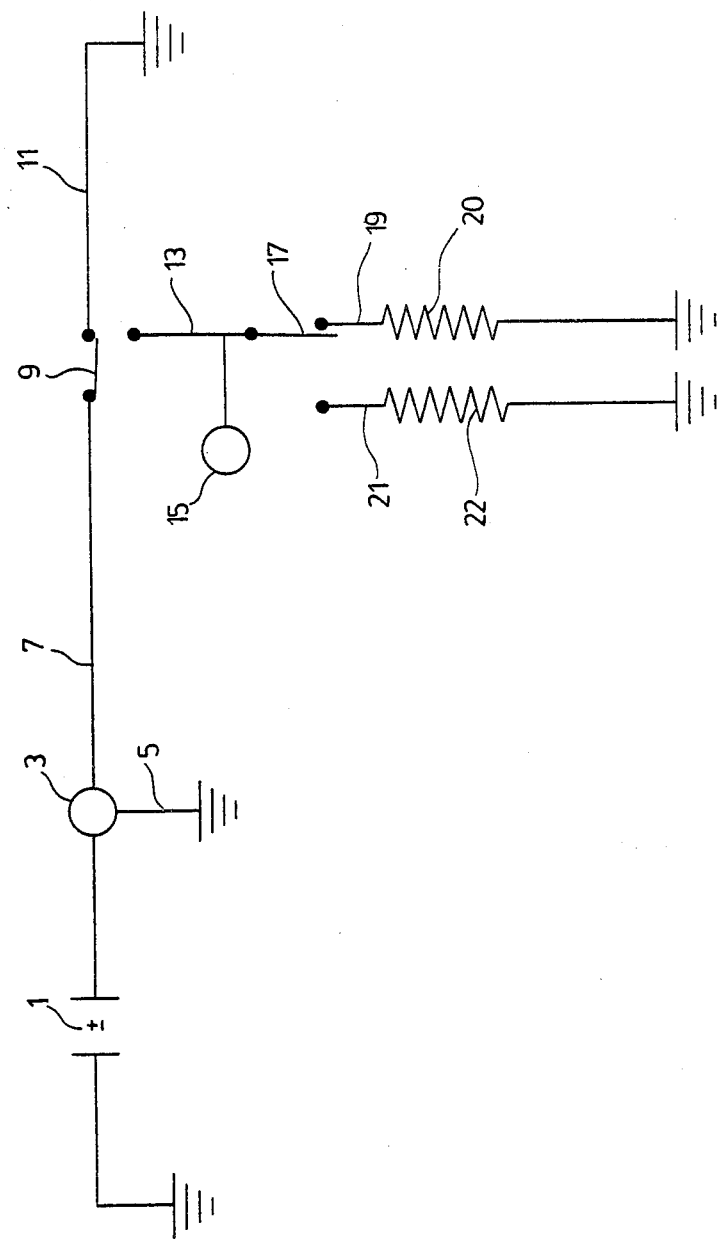

AUTOMOBILE HEADLIGHT CONTROL SYSTEM

FIELD OF THE INVENTION

The present invention relates to a lighting system for use on motorized vehicles where the system includes a first and a second set of driving lights and a switching means for switching between the sets in the event of one of the sets failing.

BACKGROUND OF THE INVENTION

As almost anyone who has driven an automobile will appreciate, it is imperative to provide as much road illumination at night as is possible without distracting oncoming drivers. Accordingly, it is almost essential that both of the low beams be in operation since the constant use of high beams is generally totally unacceptable in areas of high traffic, where, with the high beams, there is a tendency to blind drivers coming in the opposing direction.

Obviously the driver of an automobile will be immediately aware of a situation in which both of the low beams have failed. However, in instances where only one of the low beams fails, it is often the case that although the amount of illumination from the front of the car is decreased, it is not substantial enough to alert the driver of the vehicle. Again it is to be appreciated that driving with only one low beam is often very disconcerting to oncoming traffic.

SUMMARY OF THE INVENTION

The present invention relates to a lighting system for use on a vehicle which is adapted to mitigate the problems encountered in the past as a result of the non-operation of either one or both of the low beam driving lights in the vehicle. More particularly, the system of the present invention comprises a first and a second set of low beam driving lights, a set of high beam driving lights, first switching means for switching from the low beam driving lights to the high beam driving lights when the high beams are required and a second switching means for switching between the first and second sets of low beam driving lights in the event of failure of one of the low beam sets.

The second switching means can be one which is either manually or automatically operated to switch away from the faulty to the operational set of low beams.

BRIEF DESCRIPTION OF THE DRAWINGS

The above as well as other advantages and features of the present invention will be described in greater detail according to the preferred embodiments of the present invention in which:

FIG. 1 is a schematic layout of a circuit arrangement of a light system according to a preferred embodiment of the present invention.

DETAILED DESCRIPTION ACCORDING TO THE PREFERRED EMBODIMENTS

FIG. 1 shows a circuit arrangement for controlling an automobile lighting system according to the preferred embodiment of the present invention. This system is operated by the automobile battery 1, to a two-stage light switch 3 from which run both a parking light circuit 5 and a driving light circuit portion 7. When switch 3 is in its first stage power is supplied only to circuit portion 5 whereas when the switch is in its second stage, power is supplied to both circuit portions 5 and 7.

Located along circuit portions 7 is a first switch 9 which is selectively positioned between a high beam circuit portion 11 and a low beam circuit portion 13. Switch 9 is a manually operated switch and is moved between the high and low beam circuit portions according to driver control.

The low beam circuit portion 13 includes two secondary circuit portions 19 and 21 with a switch 17 being provided to switch between these two secondary circuit portions. Each of the secondary portions is connected directly to a set of low beam driving lights and in the event that one of the sets of low beam driving lights is not functional, switch 17 is moved to the other set of low beam driving lights to correct the situation.

Switch 17 may be set-up in a number of manners. Firstly, this switch may be manually operated and positioned within the vehicle so that the driver can switch between the sets when required. As will be seen, each of the circuit portions 19 and 21 is provided with resistors 20 and 22 respectively, which act as current sensors in the circuits. These current sensors operate an indicating or warning device 15 located within the vehicle, if there is an occurrence of low beam driving light failure so that the driver is immediately aware of the faulty situation for switching of switch 17 between the two low beam circuit portions.

Switch 17 may also be set-up as an automatic switch which is controlled through the current sensors in the low beam circuit portions. According to this arrangement, when a current change indicative of beam failure is sensed at switch 17, the switch automatically moves over to the second set of low beam driving lights. Warning device 15 may still be used with this arrangement to indicate failure of the first set of low beam driving lights, since the driver should be aware that a repair is required.

As will be seen from the above, with the driving light system of the present invention there is little likelihood of the driver having to go without a full set of low beams at any one time. Furthermore, according to an aspect of the present invention, the driver is immediately alerted when there is a low beam failure with the system being set-up such that the driver may, in fact, not have to make any switching whatsover through the provision of an automatic switch from one set of low beams to the other.

Although various preferred embodiments of the invention have been described herein in detail, it will be appreciated by those skilled in the art that variations may be made thereto without departing from the spirit of the invention or the scope of the appended claims.

The embodiments of the invention in which an exclusive property or privilege is claimed are defined as follows:

1. A lighting system for use on a vehicle, said system comprising a first and a second set of low beam driving lights, a set of high beam driving lights, first switching means for switching from said low beam driving lights to said high beam driving lights and second switching means for switching between said first and second sets of low beam driving lights in the event of failure of one of said low beam sets, and indicating means interiorly of the vehicle to indicate such failure.

2. A lighting system as claimed in claim 1 including a set of parking lights and third switching means for switching to and from said parking lights.

3. A lighting system as claimed in claim 1 wherein said first switching means is manually operated.

4. A lighting system as claimed in claim 1 wherein both said first and second switching means are both manually operated.

5. A lighting system as claimed in claim 3 wherein said second switching system is automatically operated.

6. A lighting system as claimed in claim 5 including a current sensor with said second switching means being automatically responsive to said current sensor for switching of said second switching means upon current changes indicative of failure at either of said sets of low beams.

7. A lighting system as claimed in claim 4 wherein said second switching means comprises a manual switch located inside the vehicle.

8. A lighting system as claimed in claim 1 wherein said indicating means comprises a current sensor for sensing current changes indicative of low beam failure.

* * * * *